J. BENSON.
Ash-Sifter.

No. 228,803.  Patented June 15, 1880.

Witnesses.
W. S. Bellows
Chas. E. Hibbard

Inventor.
J. Benson
Per Brown Bros
Attorneys

UNITED STATES PATENT OFFICE.

JOSEPH BENSON, OF BOSTON, MASSACHUSETTS.

ASH-SIFTER.

SPECIFICATION forming part of Letters Patent No. 228,803, dated June 15, 1880.

Application filed November 11, 1879.

*To all whom it may concern:*

Be it known that I, JOSEPH BENSON, of Boston, in the county of Suffolk and State of Massachusetts, have invented a certain new and useful Improvement in Ash-Sifters, of which the following is a full, clear, and exact description.

This improved ash-sifter consists in substance of a casing or frame and a sieve, which is arranged in relation to the same to be swung around in a vertical plane, and to be thereby brought to one vertical inclined position for the reception of the ashes to be sifted, and to another vertical inclined position, the reverse of the former, for the discharge from it of those portions of the ashes still remaining thereon, and to secure under these two positions of the sieve and the changing of the sieve from one of such positions to the other the automatic travel of the ashes over the surface of the sieve, first in the one direction and then in the other and opposite direction, all substantially as hereinafter described.

Figure 1:
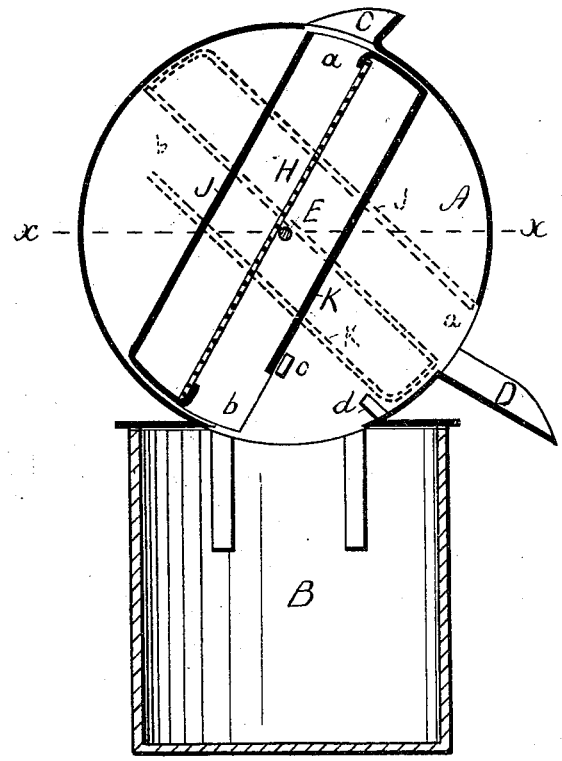
Figure 2:
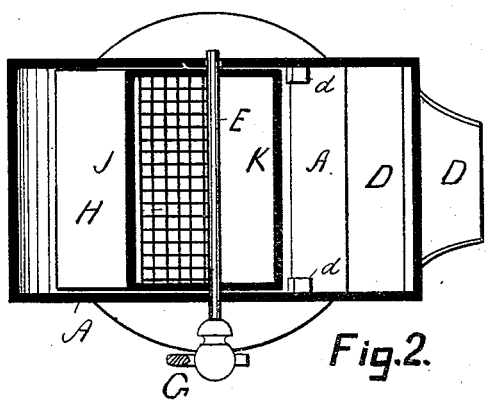
Figure 3:
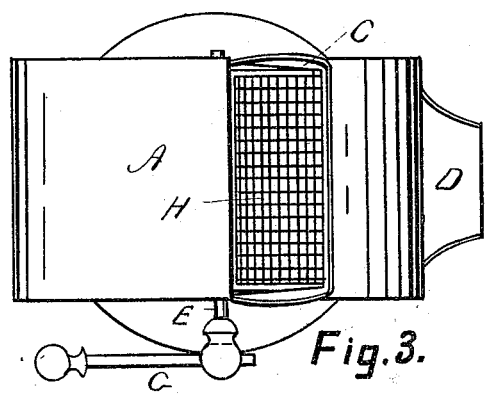

In the accompanying plate of drawings, Figure 1 is a central vertical section; Fig. 2, a horizontal section on line $xx$, Fig. 1; Fig. 3, a plan view.

In the drawings, A represents a casing, of cylindrical shape, adapted in any suitable manner to set upon the upper and open end of a barrel, B, or other suitable receptacle; C, a spout opening and leading into the casing A at its upper side, and D a spout opening and leading into the casing A at one side and near the bottom thereof; E, a transverse shaft, arranged to turn at the center of the casing and to be operated by a handle-arm, G, which is at the outside of the casing; H, a sieve, secured to shaft E so as to turn therewith.

On one side of the sieve H is a plate, J, and on the other side is a plate, K, both of which plates are attached to the sieve to turn with it, and form parts of casings about the sieve H, one casing, J, being at one side of the sieve and open at one end, $a$, and the other casing being at the other side of the sieve and open at one end, $b$, which is an end opposite to the open end $a$ of the casing J.

A sieve arranged as above described obviously can be brought by its open end $a$ either to the upper opening, C, or to the lower opening, D, in the casing A, as may be desired, by simply revolving the shaft E, to which it is attached, in the proper direction therefor.

$c\ d$ are stops on the inside of casing A, in position to arrest the swing of the sieve, the one, $c$, to leave the sieve at a vertical incline from the upper opening, C, in the casing A, and the other, $d$, to leave it at a vertical incline toward the lower and side opening, D, in the casing A, the latter incline being the reverse of the former.

With the sieve at the upper opening, C, of the casing, pour the ashes to be sifted through each opening upon the sieve; then turn the sieve and bring it to the lower opening, D, of the casing. Under these two positions of the sieve the ashes are received, sifted, and discharged, the particles of which pass through the meshes of the sieve, escaping at the open end $b$ of the sieve H to the barrel B below, and the particles which do not pass through the meshes of the sieve escaping at the open end $a$ of the sieve H through the lower side opening, D, of the casing A. The ashes travel and roll of themselves over the sieve from end to end thereof in the one and in the other direction, and between such two rolls and travels of the ashes they are most perfectly sifted and separated.

Having thus described my invention, what I claim, and desire to secure by Letters Patent, is—

1. An ash-sifter consisting of a sieve, H, arranged on a suitable support to be swung around in a vertical plane and for the ashes to travel in opposite directions over said sieve from end to end thereof, substantially as described, for the purpose specified.

2. An ash-sifter composed of a casing, A, having upper and side openings, C and D, and a sieve, H, arranged to swing in a vertical plane within said casing, and provided with open ends $a\ b$ opposite to each other, all substantially as described, for the purpose specified.

JOSEPH BENSON.

Witnesses:
 EDWIN W. BROWN,
 W. S. BELLOWS.